US 10,657,513 B2
May 19, 2020

United States Patent
Killoran, Jr.

(54) METHOD AND APPARATUS FOR USING QUICK RESPONSE CODES IN E-COMMERCE

(71) Applicant: SWOOP IP HOLDINGS LLC, Wilmington, DE (US)

(72) Inventor: John P. Killoran, Jr., Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/878,004

(22) Filed: Jan. 23, 2018

(65) Prior Publication Data

US 2018/0150822 A1    May 31, 2018

Related U.S. Application Data

(63) Continuation of application No. 13/835,801, filed on Mar. 15, 2013, now Pat. No. 9,875,470.
(Continued)

(51) Int. Cl.
*G06Q 20/22* (2012.01)
*G06Q 20/02* (2012.01)
(Continued)

(52) U.S. Cl.
CPC ........... *G06Q 20/22* (2013.01); *G06Q 20/027* (2013.01); *G06Q 20/10* (2013.01); *G06Q 20/12* (2013.01);
(Continued)

(58) Field of Classification Search
CPC .. G06Q 30/0253; G06Q 20/22; G06Q 20/027; G06Q 20/10; G06Q 20/12; G06Q 20/3276; G06Q 30/02
(Continued)

(56) References Cited

U.S. PATENT DOCUMENTS 5,426,781 A    6/1995 Kaplan et al.
5,664,110 A    9/1997 Green et al.
(Continued)

FOREIGN PATENT DOCUMENTS

WO    2006/119342 A2    11/2006

OTHER PUBLICATIONS

Lowry, P.B., Wells, T.M., Moody, G.D., Humphreys, S. and Kettles, D., 2006. Online payment gateways used to facilitate e-commerce transactions and improve risk management. Communications of the Association for Information Systems (CAIS), 17(6) , pp. 1-48. (Year: 2006).*

(Continued)

*Primary Examiner* — David J Stoltenberg
*Assistant Examiner* — Robert C Johnson
(74) *Attorney, Agent, or Firm* — Volpe and Koenig, P.C.

(57) ABSTRACT

An email payment gateway configured to enable users to receive @PAY offers using print media quick response (QR) codes. A consumer views an advertisement or product having packing with a QR code and scans the QR code. Scanning the QR code generates an email addressed to the email payment gateway requesting information on the product, which is sent to the email payment gateway. The email payment gateway receives the email and responds to the consumer with an email that includes information on the products in the advertisement. Included in the email from the email payment gateway is a button enabling the recipient to purchase the relevant item. The button preferably includes a
(Continued)

mail-to hyperlink as that generates an outgoing email reply requesting to purchase the product.

20 Claims, 10 Drawing Sheets

Related U.S. Application Data

(60) Provisional application No. 61/676,505, filed on Jul. 27, 2012.

(51) Int. Cl.
*G06Q 20/32* (2012.01)
*G06Q 30/02* (2012.01)
*G06Q 20/10* (2012.01)
*G06Q 20/12* (2012.01)

(52) U.S. Cl.
CPC ......... *G06Q 20/3276* (2013.01); *G06Q 30/02* (2013.01)

(58) Field of Classification Search
USPC ....................................................... 705/14.4
See application file for complete search history.

(56) References Cited

U.S. PATENT DOCUMENTS

| | | | |
|---|---|---|---|
| 5,694,546 A | 12/1997 | Reisman | |
| 5,706,442 A | 1/1998 | Anderson et al. | |
| 5,710,887 A | 1/1998 | Chelliah et al. | |
| 5,758,328 A | 5/1998 | Giovannoli | |
| 5,793,972 A | 8/1998 | Shane | |
| 5,794,206 A | 8/1998 | Wilkinson et al. | |
| 5,799,157 A | 8/1998 | Escallion | |
| 5,809,242 A | 9/1998 | Shaw et al. | |
| 5,825,881 A | 10/1998 | Colvin, Sr. | |
| 5,826,242 A | 10/1998 | Montulli | |
| 5,826,269 A | 10/1998 | Hussey | |
| 5,838,790 A | 11/1998 | McAuliffe et al. | |
| 5,848,397 A | 12/1998 | Marsh et al. | |
| 5,855,008 A | 12/1998 | Goldhaber et al. | |
| 5,864,823 A | 1/1999 | Levitan | |
| 5,870,717 A | 2/1999 | Wiecha | |
| 5,890,138 A | 3/1999 | Godin et al. | |
| 5,897,622 A | 4/1999 | Blinn et al. | |
| 5,899,980 A | 5/1999 | Wilf et al. | |
| 5,903,878 A | 5/1999 | Talati et al. | |
| 5,905,973 A | 5/1999 | Yonezawa et al. | |
| 5,960,411 A | 9/1999 | Hartman et al. | |
| 5,970,469 A | 10/1999 | Scroggie et al. | |
| 6,101,485 A | 8/2000 | Fortenberry et al. | |
| 6,154,738 A | 11/2000 | Call | |
| 6,246,996 B1 | 6/2001 | Stein et al. | |
| 6,938,048 B1 | 8/2005 | Jilk et al. | |
| 6,954,737 B2 | 10/2005 | Kalantar et al. | |
| 6,993,559 B2 | 1/2006 | Jilk, Jr. et al. | |
| 7,395,241 B1 | 7/2008 | Cook | |
| 7,533,064 B1 | 5/2009 | Boesch | |
| 7,577,587 B2 | 8/2009 | Gee | |
| 7,912,910 B2 | 3/2011 | Banerjee et al. | |
| 7,974,875 B1* | 7/2011 | Quilici ............... | G06Q 30/0241 705/14.4 |
| 8,156,012 B1 | 4/2012 | Eisner et al. | |
| 8,606,703 B1 | 12/2013 | Dorsey et al. | |
| 2002/0010746 A1 | 1/2002 | Jilk, Jr. et al. | |
| 2002/0065828 A1 | 5/2002 | Goodspeed | |
| 2002/0103752 A1 | 8/2002 | Berger et al. | |
| 2002/0120581 A1 | 8/2002 | Schiavone et al. | |
| 2002/0120692 A1 | 8/2002 | Schiavone et al. | |
| 2002/0178360 A1 | 11/2002 | Wenocur et al. | |
| 2003/0009392 A1* | 1/2003 | Perkowski ............. | G06Q 30/02 705/14.51 |
| 2003/0069786 A1* | 4/2003 | Hoffman ................ | G06Q 10/06 705/14.51 |
| 2003/0163413 A1 | 8/2003 | Wiczkowski | |
| 2003/0217107 A1 | 11/2003 | Parry | |
| 2003/0233318 A1 | 12/2003 | King | |
| 2004/0024655 A1 | 2/2004 | Estes | |
| 2004/0210479 A1* | 10/2004 | Perkowski ............. | G06Q 30/02 705/14.51 |
| 2005/0004867 A1 | 1/2005 | Spector | |
| 2005/0010475 A1* | 1/2005 | Perkowski ............. | G06Q 30/02 705/14.51 |
| 2005/0044003 A1 | 2/2005 | O'Keefe et al. | |
| 2005/0160038 A1 | 7/2005 | Albornoz | |
| 2005/0251460 A1 | 11/2005 | Quigley | |
| 2006/0085504 A1 | 4/2006 | Yang et al. | |
| 2006/0224729 A1 | 10/2006 | Rowe et al. | |
| 2006/0241860 A1* | 10/2006 | Kimchi .................. | G01C 21/26 701/532 |
| 2007/0022007 A1 | 1/2007 | Lawe | |
| 2007/0094076 A1* | 4/2007 | Perkowski ............. | G06Q 30/02 705/14.51 |
| 2008/0091528 A1* | 4/2008 | Rampell ............... | G06Q 50/188 705/14.1 |
| 2008/0097905 A1 | 4/2008 | Neofytides et al. | |
| 2008/0184076 A1 | 7/2008 | Yamazaki et al. | |
| 2009/0254447 A1 | 10/2009 | Blades | |
| 2009/0265272 A1 | 10/2009 | Dill et al. | |
| 2009/0276345 A1 | 11/2009 | Hughes | |
| 2009/0327126 A1 | 12/2009 | Schoenberg et al. | |
| 2010/0010886 A1 | 1/2010 | Flynn, Jr. | |
| 2010/0049631 A1 | 2/2010 | Goldman | |
| 2011/0028160 A1 | 2/2011 | Roeding et al. | |
| 2011/0202615 A1 | 8/2011 | Fletcher | |
| 2011/0264555 A1 | 10/2011 | Turner-Rielle | |
| 2011/0295749 A1 | 12/2011 | Scalisi | |
| 2012/0078782 A1* | 3/2012 | Schoenberg ......... | G06Q 20/102 705/40 |
| 2012/0109781 A1 | 5/2012 | Felt et al. | |
| 2012/0215603 A1 | 8/2012 | Pivato et al. | |
| 2012/0221724 A1* | 8/2012 | Chor ................... | G06F 16/9566 709/225 |
| 2012/0253897 A1 | 10/2012 | Killoran et al. | |
| 2012/0276868 A1 | 11/2012 | Martell | |
| 2012/0310753 A1 | 12/2012 | Gaddis | |
| 2012/0330769 A1 | 12/2012 | Arceo | |

OTHER PUBLICATIONS

Premchaiswadi, N., Williams, J.G. and Premchaiswadi, W., Oct. 2009. A Study of an On-Line Credit Card Payment Processing and Fraud Prevention for e-Business. In E-Learn: World Conference on E-Learning in Corporate, Government, Healthcare, and Higher Education (pp. 2199-2206). (AACE) (Year: 2009).*

Truxa, Ivo, MIVA® Merchant: MmPGP Secure PGP Email Merchant Notification Module, http://mivo.truxoft.com/mm0001.htm, Jan. 21, 2011, pp. 1-10.

"How do I make a PayPal Donation Button?" posted on Jun. 24, 2009 at http://www.ivanwalsh.com/paypal/how-do-i-make-a-paypal-donation-button.

"PayPal Community Help Forum" posted on Feb. 20, 2011 at https://www.paypal-community.com/t5/Donations-and-Fundraising/website-with-diffeernt-donation-amounts/td-/198966.

"PayPal Developer—Getting Started with Donate Buttons" https://developer-paypal.com/docs/classic/paypal-payments-standard/integration-guide/donation_buttons/-Shown in Google Search to have originated in 2008.

* cited by examiner

METHOD AND APPARATUS FOR USING QUICK RESPONSE CODES IN E-COMMERCE

CROSS REFERENCE TO RELATED APPLICATIONS

This application is a continuation of U.S. patent application Ser. No. 13/835,801, filed Mar. 15, 2013, which issued on Jan. 23, 2018 as U.S. Pat. No. 9,875,470, and claims the benefit of U.S. provisional application No. 61/676,505, filed Jul. 27, 2012, which are incorporated herein by reference as if fully set forth.

BACKGROUND

Currently available mechanisms for performing electronic financial transactions such as electronic purchases are inefficient, time consuming, and not user friendly. A need therefore exists for a secure electronic system and method for managing electronic purchases more securely, conveniently and efficiently.

SUMMARY

A method and apparatus for enabling users of an email payment gateway to receive @PAY offers using print media quick response (QR) codes. A consumer views an advertisement or product having packing with a QR code and scans the QR code. Scanning the QR code generates an email addressed to the email payment gateway requesting information on the product, which is sent to the email payment gateway. The email payment gateway receives the email and responds to the consumer with an email that includes information on the products in the advertisement. Included in the email from the email payment gateway is a button enabling the recipient to purchase the relevant item. The button preferably includes a mail-to hyperlink as that generates an outgoing email reply requesting to purchase the product.

BRIEF DESCRIPTION OF THE DRAWINGS

A more detailed understanding may be had from the following description, given by way of example in conjunction with the accompanying drawings wherein.

DETAILED DESCRIPTION

Figure 1:
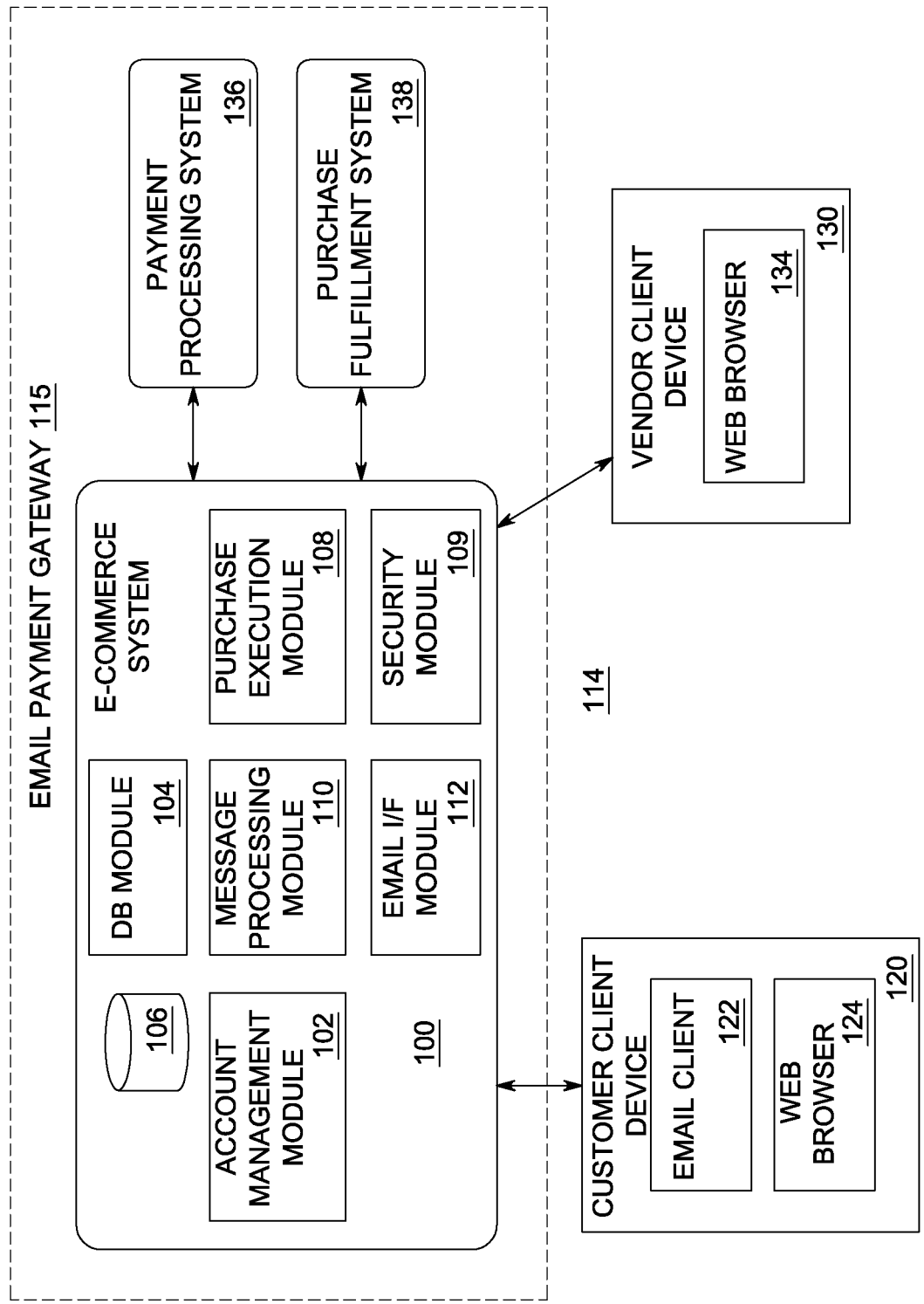
FIG. 1 shows a logical architecture for engaging in electronic commerce using email.

FIG. 1 shows an example logical architecture 114 for email-based e-commerce. The example architecture 114 may include a customer client device 120, an e-commerce system 100, a payment processing system 136, a purchase fulfillment system 138, and a vendor client device 130. The e-commerce system 100 may include an account management module 102, a database module 104, an e-commerce database 106, a purchase execution module 108, a security module 109, a message processing module 110, and an email interface module 112.

It is noted that one or more of the e-commerce system 100, the payment processing system 136, and/or purchase fulfillment system 138 may be collectively be referred to hereinafter as an email payment gateway 115. Further, the email payment gateway 115, in addition to comprising one or more of the e-commerce system 100, the payment processing system 136, and/or purchase recognition fulfillment system 138, may be configured to include one of more of the individual components of the e-commerce system 100 as desired.

As will be described in further detail below, the e-commerce system 100 and customer client device 120 may exchange email messages to initiate and manage purchases. Also as will be described in further detail below, the e-commerce system 100 may communicate with the payment processing system 136 and the purchase fulfillment system 138 to execute the transactions.

The account management module 102 in the e-commerce system 100 may manage data related to accounts for customers and vendors using the e-commerce system 100. The account management module 102 may be or include, for example, a web application. Vendors may interact with the account management module 102 via a web browser, such as the web browser module 134 in the vendor client device 130. As one example, a user of the vendor client device 130 may provide information to the account management module 102 such as: information related to a particular product to be used for email advertisements to be sent to customers in email campaigns; email formatting information to be used for email advertisements to be sent to customers; financial information related to bank accounts and/or other types of financial accounts (e-Payment accounts such as PayPal accounts) that may be used to receive payments from customers using the e-commerce system 100, such as account numbers and/or other identifying information; and/or other information. Customers may register with the e-commerce system 100 by interacting with the account management module 102 via a web browser, such as the web browser module 124 in the customer client device 120. A user of the customer client device 120 may provide information to the account management module 102 via the web browser module 124 such as: an email address associated with the customer; financial information associated with the customer, such as a credit card information (such as a credit card number and expiration date), and/or other information related to bank accounts and/or other types of financial accounts (such as e-payment accounts) that may be used to make payments to vendors via the e-commerce system 100; shipping address information; billing address information;

preferences regarding which vendors the customer would like to receive email advertisements from; and/or other information.

The account management module 102 may, via the database module 104, store information received from the customer client device 120 and/or the vendor client device 130 in the e-commerce database 106. The account management module 102 may also add information to the e-commerce database 106 when customers and vendors register with the e-commerce system 100, such as customer identifiers, vendor identifiers, and other identifying information.

The security module 109 generates a plurality of Universal Unique Identifiers (UUIDs) 202. A UUID is an identifier standard used in software construction, standardized by the Open Software Foundation (OSF) as part of the Distributed Computing Environment (DCE).

Utilizing UUIDs enables distributed systems to uniquely identify information without significant central coordination. Since the identifiers have a finite size, it is possible for two differing items to share the same identifier. However, the identifier size and generation process are selected such that this is sufficiently unlikely.

In one embodiment, the UUIDs have a length of 32 characters, in groups, separated by a "dash" (–) character. For example, in one embodiment, an example generated code may be: 891BE826-C023-4DAD-9E53-EE62B-836079C.

The message processing module 110 (in conjunction with the email interface module 112) may generate and transmit email messages to customers registered with the e-commerce system 100, such as the user of the customer client device 120. The advertisement email messages may be HyperText Markup Language (HTML) email messages, Rich Text Format (RTF) email messages, and/or may be defined according to any other appropriate format. The advertisement email messages may include Uniform Resource Identifiers (URIs) or hyperlinks that are defined according to the mailto URI scheme. Each mailto URI or hyperlink may describe an email message that may be generated by an email client module (such as the email client module 122) when that URI or hyperlink is selected. The generated message may include a number of parameters that indicate, for example, a product the customer wishes to purchase, which was advertised in the advertisement email. Of course, the generated message may also include the identity of the customer who is the recipient of the generated message (e.g. John Smith).

In the situation where the customer wishes to purchase one or more products indicated in the message, the customer may reply to the generated message, in which case a message is sent to the e-commerce system 100 and, in one embodiment, received by the message processing module 110. When the generated message is received by the message processing module 110, the message processing module 110 may then initiate a transaction to purchase one or more products indicated in the message on behalf of the customer. In such an instance, the message processing module 110 may interact with the purchase execution module 108 to perform the transaction.

The email interface module 112 may be configured to use one or more email accounts that are associated with the e-commerce system 100, and to send and receive messages associated with the one or more email accounts. The email interface module 112 and/or the email client module 122 in the customer client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The interface module 112 and/or the email client module 122 may use these technologies to transmit and/or receive email messages via one or more email servers (not depicted). The email client module 122 may be or include an email client such as Microsoft Outlook, Thunderbird, a web browser application, or any other client application for the communication of email messages. In an instance where the email client module 122 is or includes a web browser application, the email client module 122 may be the same web browser described above that may be used to communicate with the account management module 102; alternatively the email client module 122 and the web browser described above that may be used to communicate with the account management module 102 may be different.

The payment processing system 136 may be, as one example, a system that is operated by a financial institution for the purposes of processing payments made by customers using the email payment gateway 115. In such cases, the payment processing system 136 may have a connection to one or more banking networks (not depicted, such as banking institutions; Visa, Mastercard, American Express; or PayPal; or the like) that it may use to process payments corresponding to their respective purchase amounts. The purchase execution module 108 may communicate with the payment processing system 136 using technology such as Transport Layer Security (TLS) or Secure Sockets Layer (SSL) technology. The purchase fulfillment system 138 may be an order management system (OMS), Enterprise Resource Planning (ERP), supply chain management, electronic purchasing system, inventory control system, or any other appropriate system for fulfilling orders. When fulfilling purchases, the purchase fulfillment system 138 may, in addition to sending an indication to the customer, be configured to provide some type of public acknowledgement (such as an electronic or social networking posting, blast or tweet) indicating that the customer has purchased the particular product. Such acknowledgements preferably require the authorization of the customer. Vendors may choose to compensate customers for agreeing to allow such public acknowledgement.

The e-commerce database 106 may store information such as information that describes email campaigns, email advertisements that may be sent to customers, customer information, vendor information, product information, status related information, and/or other information.

Additionally, the e-commerce database 106 may store information that indicates correspondences between different email campaigns, advertisements, customers, vendors, products, information related to order statuses, and/or other information. For each email campaign, the e-commerce database 106 may store information that includes an identifier of the vendor associated with the campaign, identifiers of the products associated with the campaign, and/or other information. For each order that is placed with the e-commerce system 100, the e-commerce database 106 may store information such as an identifier of the customer that made the order, when the order was placed, an identifier of the product associated with the order, and/or other information.

For each product described in the e-commerce database 106, the e-commerce database 106 may store information that includes an identifier of the product, a description of the product, a title of the product, an identifier of the vendor associated with the product, a cost of the product, and/or other information.

The e-commerce database 106 may be spread across one or any number of computer-readable storage media (not depicted). The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

Each or any combination of the modules described above with reference to FIG. 1 (including the account management module 102, database module 104, purchase execution module 108, message processing module 110, email interface module 112, email client module 122, web browser module 134, and the web browser module 124 in the customer client device 120) may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure. Additionally, the system 100 may comprise a single server or computer, or may comprise a plurality of servers or computers, or a much larger integrated or distributed computer network including a plurality of computers and communication devices and networks. One example of such an extended network is the Internet. The terminology customer client device 120 will be referred to hereinafter as comprising a mobile or stationary device or terminal.

Figure 2:
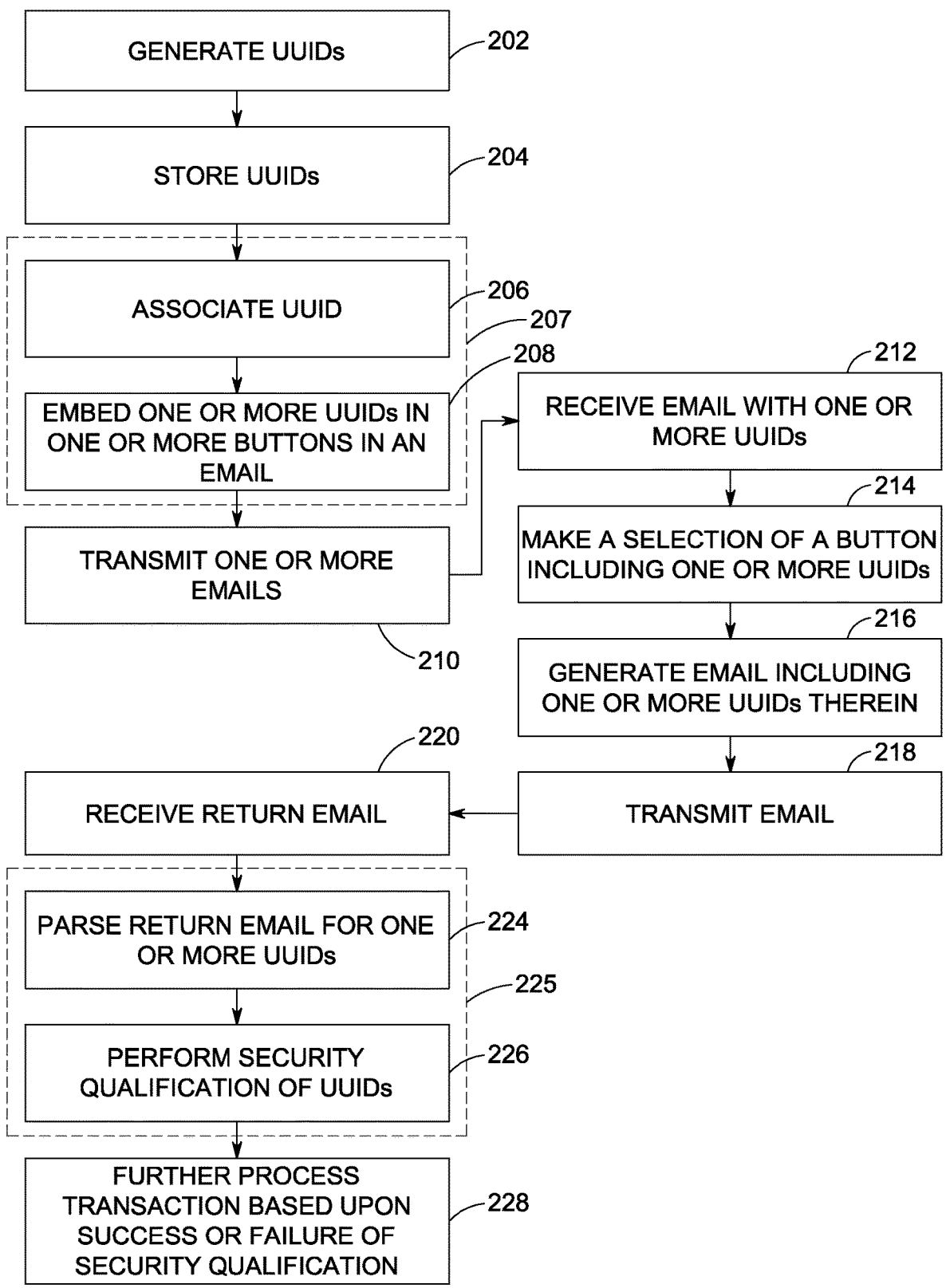
FIG. 2 shows a method for authenticating an email.

Referring to FIG. 2, a method 200 for authenticating an email in accordance with the present invention is shown. The method 200 is shown between the system 100 and a customer client device 120.

As aforementioned, the security module 109 generates 202 a plurality of UUIDs. The UUIDs as delivered in an email message are "opaque", in that the associated authentication information is not ultimately derivable from parsing the UUID. Although the UUID will be associated with particular authentication information within the database 106, (such as a customer, a campaign, a particular item, an expiration date, etc.), this information is not derivable from the UUID.

Once the UUIDs are generated 202, they are stored 204 in the database 106 for later use. It should also be understood by those of skill in the art, that the storing 204 of the UUIDs is not necessary, in that the UUIDs may be generated 102 upon demand, (i.e. when they are needed), so that storing 204 of the UUIDs is not necessary. Accordingly, those of skill in the art should understand step 204 as being optional.

When a new email "campaign" is to be conducted, the UUIDs are retrieved from memory, (or the UUIDs are generated upon demand if they were not previously generated and stored). The UUIDs are associated 206 with particular authentication information to create an authentication control packet. Once each UUID is associated 206 with particular authentication information to create an authentication control packet 300, one or more UUIDs may be embedded in an email as one or more buttons, for example. The email is then transmitted 210 from the system 100 to the customer client device 120. The customer client device 120 receives 212 the email, and the customer is allowed to review the email and make a selection 214 of one or more of the buttons, which in one embodiment, may correspond to one or more products.

The selection 214 of one or more of the buttons by the causes causes the customer client device 120 to generate 216 a return email which includes the UUIDs associated with the one or more selected buttons. The return email including the UUIDs is then transmitted 218 from the customer client device 120 to the system 100 where it is received 220. It should be noted by those of skill in the art that although the return email is shown as being transmitted 218 back to the system 100, it may also be sent to a third party site for processing without departing from the spirit and scope of the present invention.

Initial processing 225 of the return email is performed in steps 224 and 226. In step 224, the return email is parsed for one or more UUIDs. In step 226, security qualification of the UUIDs is performed. In step 228, the system further processes the transaction based upon the success or failure of the security qualification.

Figure 3:
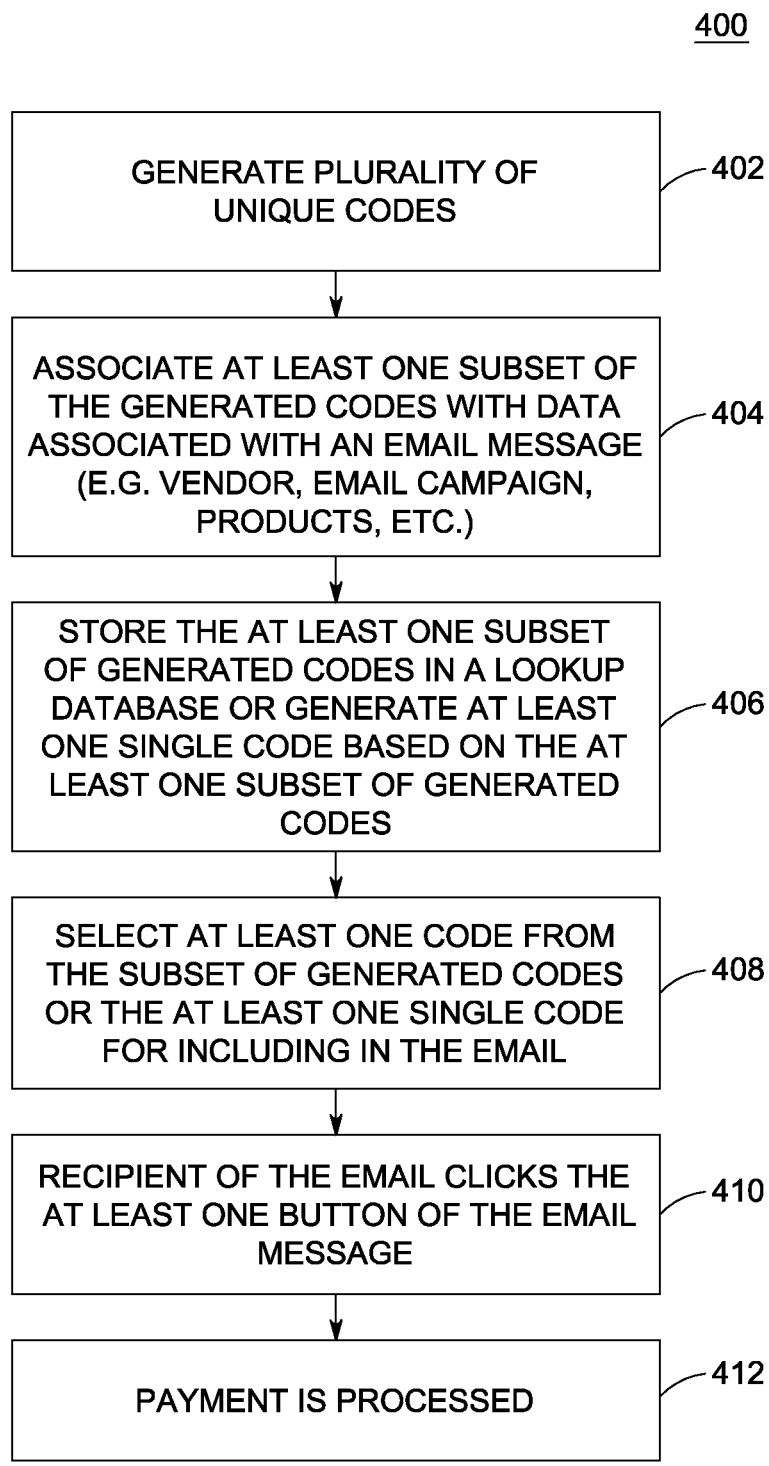
FIG. 3 is a method implemented with an email payment gateway.

FIG. 3 is a flow diagram of a method 400 of a disclosed embodiment wherein purchases made using an email payment gateway 115. The method 400 begins with step 402 wherein a plurality of unique codes are generated. The unique codes may be generated using any coding technique and any coding generation process. As described in more detail above, by way of example, the unique code may be a universally unique identifier (UUID). The UUID may be any length. Hereafter, the terms "codes" and "UUID's" may be used interchangeably Next, in step 404, at least one subset of the generated UUIDs are associated with various data sets included in an email message that may be sent to one or more recipients. The various data sets included in an email may be configured as desired, but in general relate to offering products for sale such as a vendor, email campaign, products being offered for sale, etc.

Figure 4:
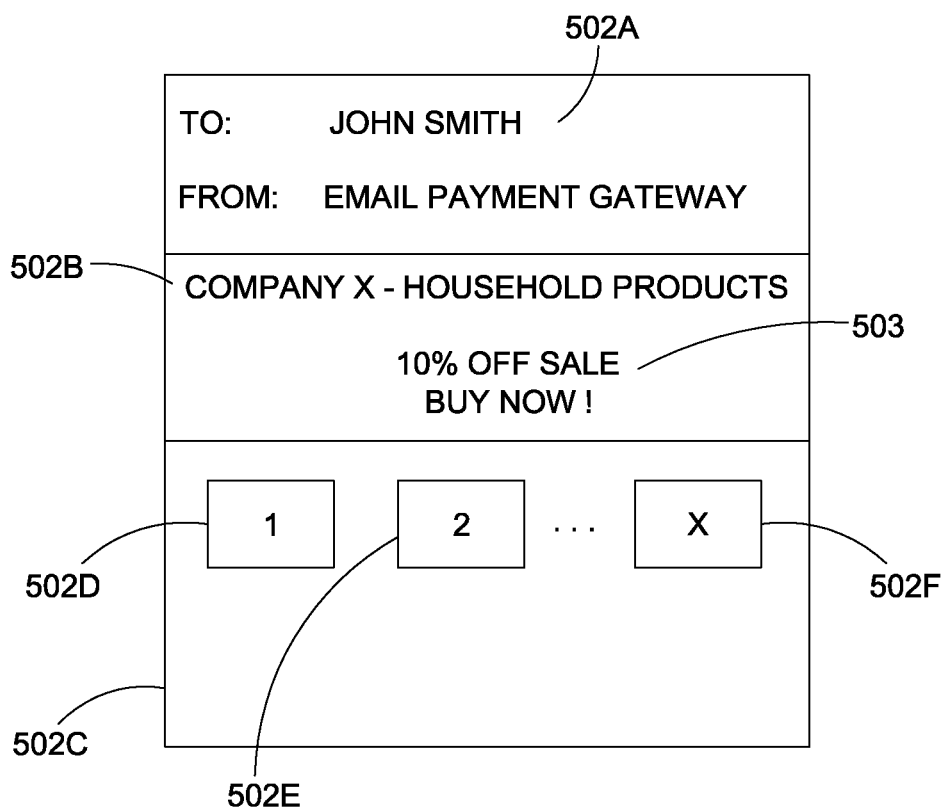
FIG. 4 is a diagram of an email sent from an email payment gateway to a customer.

For example, in the context of various household products offered for sale by Company X and referring now to FIG. 4, an email 502 may include a data set indicative of a recipient (i.e. a member who may or may not be registered with the email payment gateway 115) 502A (e.g. John Smith), a data set indicative of a particular vendor 502B, a data set indicative of a particular email campaign 503 (e.g. 10% off sale), and a data set indicative of various products offered for sale 502C, such as product 1, product 2, and product X. It is noted that for vendors who offer multiple types of products for sale, data set 502B may, in addition to identifying the vendor, also indicate the type of products being offered in email 502 (e.g. household products). It is further noted that the terms email campaign and email blast may used interchangeably herein. As mentioned hereinbefore, the various data sets included in an email such as email 502 may be configured as desired. An example configuration is where a plurality of executable hyperlinks (i.e. buttons) are provided for each product in data set 502C. To illustrate this example, button 502D is an executable hyperlink for purchasing product 1, button 502E is an executable hyperlink for purchasing product 2, and button 502F is an executable hyperlink for purchasing product X.

Referring back to FIG. 3, in step 406, the subset of generated UUIDs may be stored in a database. The database may be a database such as database 106 described above, or may be a separate database provided for the purpose of retrieving and verifying information sent to the email payment gateway 115 in response to emails sent from the email payment gateway 115. That is, in addition to the storage of UUIDs, providing the ability to retrieve the UUIDs later when sending subsequent emails versus regenerating them when sending subsequent emails as discussed above, storing the UUIDs in a database (either a same database or a separate database) enables different options for efficiently processing responses from customers to emails containing the subset of generated codes, or enables efficient processing by third parties.

Figure 5:
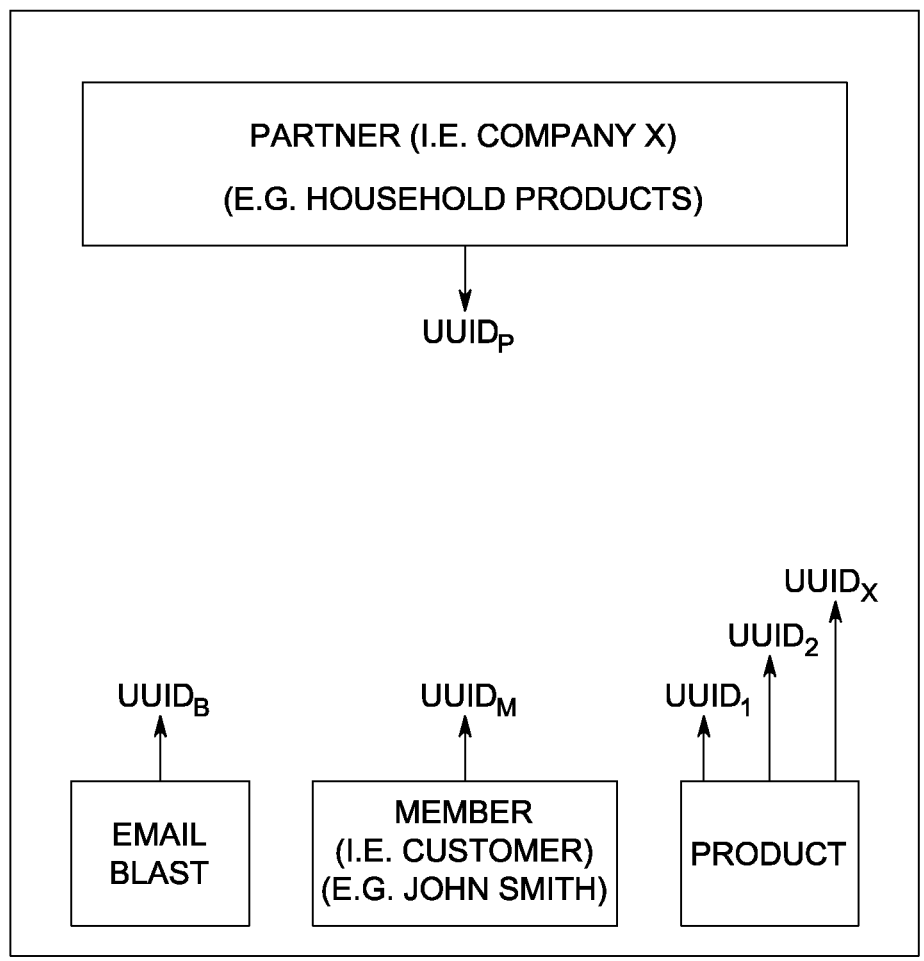
FIG. 5 is a diagram showing UUIDs and the data with which they are associated wherein the UUIDs are associated with each other.

For example, in one embodiment, each UUID in the subset of generated UUIDs is associated with each other in the database within which they are stored, such that all of the generated UUIDs that make up the subset may be retrieved from the database by applying any one of the subset of generated UUIDs to the database. To provide an example of such an arrangement, reference is made to FIG. 5. In FIG. 5, a subset of generated UUIDs are shown as UUIDp, UUIDb, UUIDm, UUID1, UUID2, and UUID2. This subset of generated UUIDs are associated with a data set included in the email 502 of FIG. 4 where UUIDp corresponds to the particular vendor and optionally a type of product which in the current example is Company X—household products 502B as shown in FIG. 4, UUIDb corresponds to 10% off sale 503, UUIDm corresponds to John Smith 502A and UUID1, UUID2 and UUIDx correspond to products 1, 2, and x, respectively. In such a scenario, a reply email sent from John Smith to the email payment gateway (115 of FIG. 1) will enable the email payment gateway 115 to retrieve the entire subset of associated UUIDs and verify the information and, once verified, process the payment for purchasing the selected product. The reply email is generated by the user simply executing the button associated with the product he/she wishes to purchase. Therefore, in one embodiment, the email payment gateway 115 may be configured such that when a reply email is sent in response to email 502, the reply email will include the UUID corresponding to the selected product and UUIDm corresponding to the identity of the sender, John Smith 502A (and optionally, as additional levels of security, the UUIDp corresponding to the partner and/or UUIDb corresponding to the email blast). In this manner, a relatively small amount of data is sent in the reply email but all of the UUIDs in the subset may be retrieved and verified based on receipt of the UUIDs in the reply email. Once verified, the donation may be processed. The UUIDs may be visible to the user or not visible, depending upon the manner in which the buttons are encoded. This is a technology choice which will be clearly understood by those of skill in the art.

Figure 6:
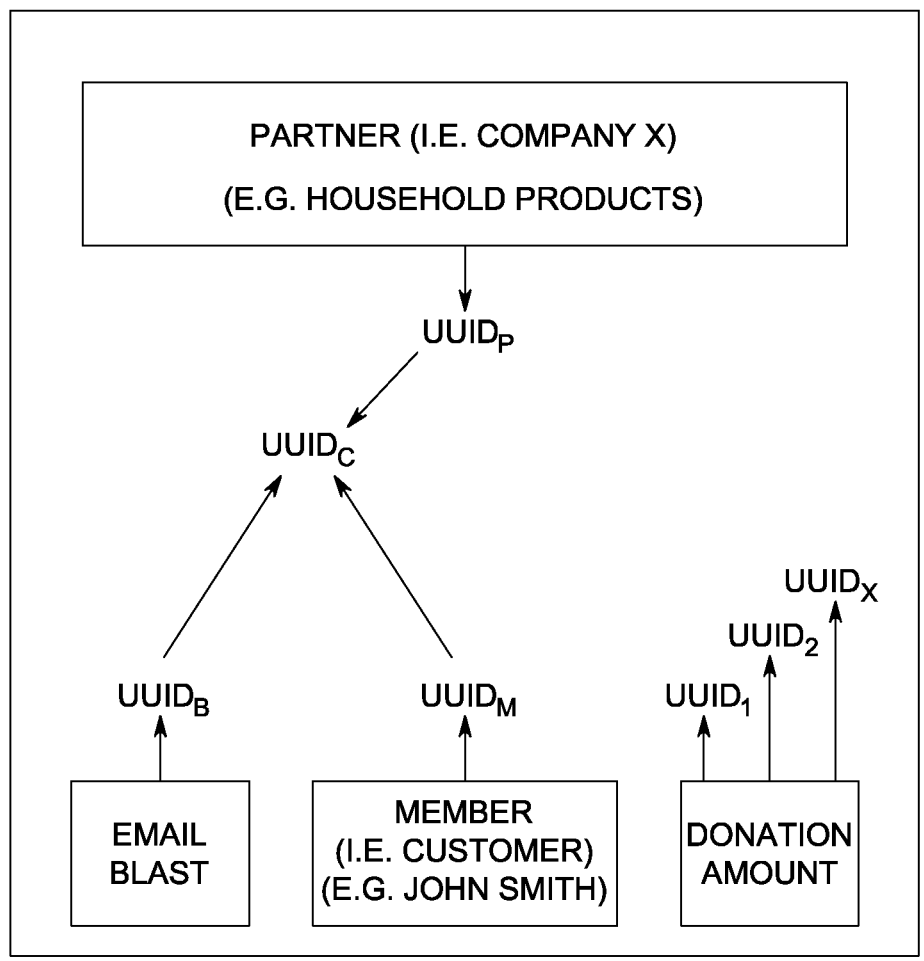
FIG. 6 is a diagram showing UUIDs and the data with which they are associated wherein a plurality of the UUIDs are combined into a single UUID for inclusion into an email.

In another embodiment, and as also described in step 406, instead of associating each of the UUIDs with each other and storing them in a database as described hereinbefore, UUIDp, UUIDb, and UUIDm, may be combined to generate a single UUID (UUIDc as shown in FIG. 6). In this embodiment, UUIDc and UUID1, UUID2, and UUIDX are included in emails sent from the email payment gateway to a recipient. Reply emails sent back to the email payment gateway 115 from the recipient include UUIDc and at least one of UUID1, UUID2, and UUIDX corresponding to the selected donation amount. In this embodiment, upon receipt of return emails, the email payment gateway 115 does not need to retrieve and compare all of the received UUIDs from a database prior to verifying the email. Instead, the email payment gateway 115 may only compare the received UUIDc with its list of active UUIDc identifiers to verify the email. Once verified, payment is processed for the purchases item according to the at least one of UUID1, UUID2, and UUIDX as included in the received email 502 of FIG. 4.

Of course, as noted above, while two examples of code generation are provided, the UUIDs may be generated, associated, configured, related or otherwise structured with respect to not only how they related to the data sets of the emails but also with respect to optimization of backend retrieval, verification and processing.

Referring back to FIG. 3, the next step is to select one or more codes to be included in the email message being sent from the email payment gateway 115 to a customer (step 408). As described hereinbefore, the codes may be generated in any manner as desired and the selection of codes for inclusion in the email sent from the email payment gateway 115 to a customer may be related to the manner in which the codes are generated. For example, where the subset of generated codes are each associated with each other such that the entire subset may be retrieved based on any one code of the subset; step 408 requires the selection of which code(s) to include in the emails to/from the email payment gateway 115 and to use for retrieval purposes. On the other hand, where a plurality of codes in the subset of generated codes are combined into a single code, the combined code, and possibly any other codes corresponding to specific products being offered for sale are selected to include in the emails to/from the email payment gateway 115.

Referring back to FIG. 3, a recipient of an email executes 410 one of the buttons included therein to generate a reply email capable of causing the recipients intended purchase to occur automatically from the perspective of the user with no further steps required by the user.

Figure 7:
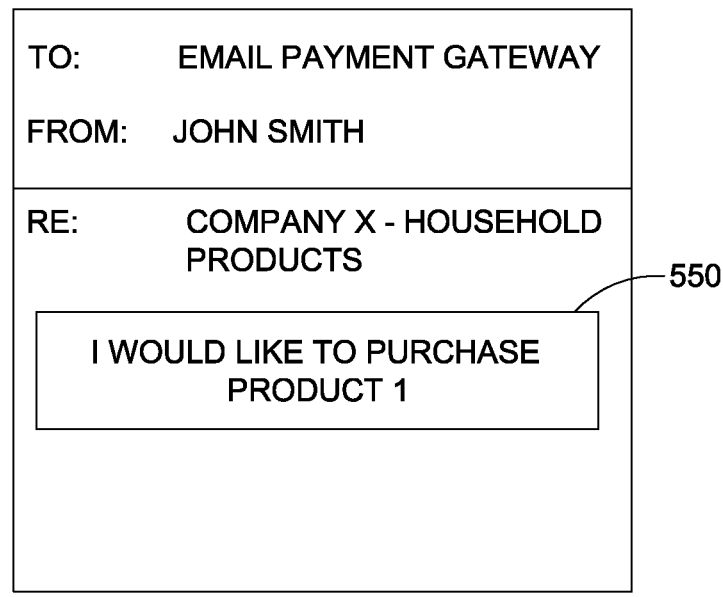
FIG. 7 is a diagram of an email sent from a customer to an email payment gateway.

To provide a first example embodiment showing a possible implementation of step 410 of FIG. 3, reference is made to FIGS. 4 and 7 and user-received email 502 and user-reply email 510 in particular. In FIG. 4, by way of example, an embodiment is shown wherein a recipient, John Smith, executes button 502D of email 502 in FIG. 4 wherein button 502D corresponds to product 1.

As discussed hereinbefore when describing the embodiment where UUIDs are associated with each other, the button 502D corresponding to product 1 includes UUID1 which: a) belongs to the subset of generated UUIDs associated with the 10% off sale; and b) is one of the subset of generated UUIDs stored in the database 504 of the email payment gateway 115.

In this embodiment, upon execution of the button 502D corresponding to product 1, a reply email 510 (FIG. 7) is generated and sent to the email payment gateway 501. The email 510 includes UUID1 embedded therein (shown using reference numeral 550 for convenience). UUID1 is applied to a database of the email payment gateway 115 to positively match and identify the UUID1 as a valid UUID, and then to obtain additional information regarding the partner/campaign/member/etc. and the email 510 is then processed by the email payment gateway 115 as shown in in step 412 of FIG. 3.

In this example, the instructed financial transaction is a purchase of product 1, which belongs to household products offered for sale from Company X as part of its 10% off sale campaign. Of course, in accordance with the second code generation example provided above, where a combination UUID is used such as UUIDc, the step of retrieving data stored in a database is not necessary.

Figure 8:
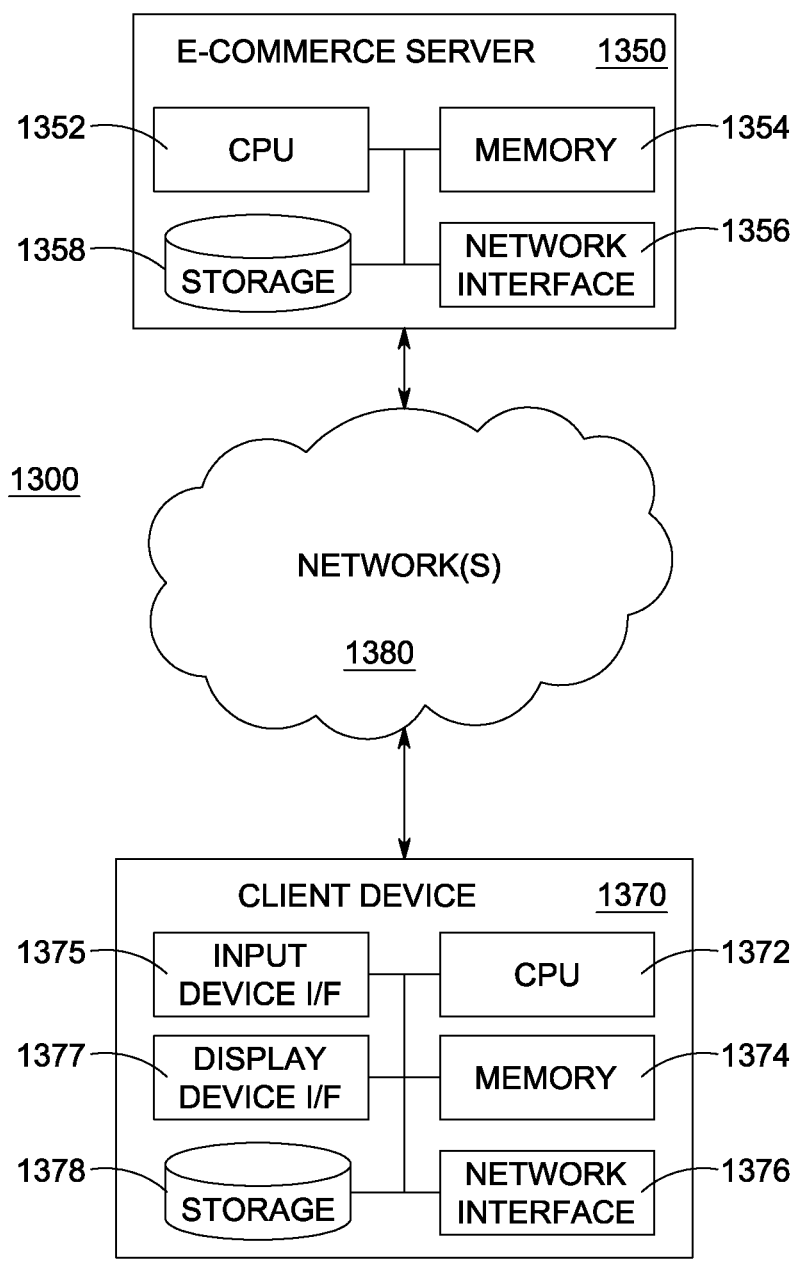
FIG. 8 shows an example system that may be used to implement the present invention.

FIG. 8 shows an example system 1300 that may be used to implement features of the present invention. The example system 1300 includes an e-commerce server 1350, a client device 1370, and one or more networks 1380.

The e-commerce server 1350 may include at least one processor 1352, memory device 1354, network interface 1356, and storage device 1358. The client device 1370 may include at least one processor 1372, memory device 1374, network interface 1376, input device interface 1375, display device interface 1377, and storage device 1378.

The e-commerce server 1350 may be configured to perform any feature or combination of features described hereinbefore as performed by the account management module 102, database module 104, order execution module 108, message processing module 110, and/or email interface module 112. The client device 1370 may be configured to perform any feature or combination of features described above with reference to FIGS. 1-5 as performed by the email client module 122 and/or the web browser module in the customer client device 120. The client device 1370 may be, for example, a desktop computer, a laptop computer, a netbook, a tablet computer, a personal digital assistant (PDA), a cellular phone, or any other appropriate device.

Each or any of the memory devices 1354, 1374 may be or include a device such as a Dynamic Random Access Memory (D-RAM), Static RAM (S-RAM), or other RAM or a flash memory. Each or any of the storage devices 1358, 1378 may be or include a hard disk, a magneto-optical medium, an optical medium such as a CD-ROM, a digital versatile disk (DVDs), or Blu-Ray disc (BD), or other type of device for electronic data storage. The storage device 1358 in the e-commerce server 1350 may store the information or any subset of the information described hereinbefore as stored in the e-commerce database 106.

Each or any of the network interfaces 1356, 1376 may be, for example, a communications port, a wired transceiver, or a wireless transceiver. Each or any of the network interfaces 1356, 1376 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 1356, 1376 may be used by the e-commerce server 1350 and/or the client device 1370 to communicate via the one or more networks 1380. The network interface in the e-commerce server 1350 may be configured to communicate any of the messages and/or other information described hereinbefore as communicated by the account management module 102, database module 104, order execution module 108, message processing module 110, and/or email interface module 112. The network interface 1376 in the client device 1370 may be configured to communicate any of the messages and/or other information described hereinbefore as communicated by the email client module 122 and/or by the web browser module in the customer client device 120 used for communicating with the account management module 102.

The one or more networks 1380 may include one or more private networks and/or one or more public networks such as the Internet. The one or more networks 1380 may be based on wired and/or wireless networking technologies.

The input device interface 1375 in the client device 1370 may be an interface configured to receive input from an input device such as a keyboard, a mouse, a trackball, a scanner, a touch screen, a touch pad, a stylus pad, and/or other device. The input device interface 1375 may operate using a technology such as Universal Serial Bus (USB), PS/2, Bluetooth, infrared, and/or other appropriate technology. The input device interface 1375 may be configured to receive any or any combination of the user input described hereinbefore as received by the by the email client module 122 and/or by the web browser module in the customer client device 120 used for communicating with the account management module 102.

The display device interface 1377 may be an interface configured to communicate data to a display device (not depicted). The display device interface 1377 may operate using technology such as Video Graphics Array (VGA), Super VGA (S-VGA), Digital Visual Interface (DVI), High-Definition Multimedia Interface (HDMI), or other appropriate technology. The client device 1370 may include or be connected to a display device (not depicted) via the display device interface 1377. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 1377, any display elements described hereinbefore as displayed by the email client module 122 and/or by the web browser module in the customer client device.

The memory device 1354 and/or the storage device 1358 of the e-commerce server 1350 may store instructions which, when executed by the at least one processor 1352, cause the at least one processor 1352 to perform any feature or combination of features described hereinbefore as performed by the account management module 102, database module 104, order execution module 108, message processing module 110, and/or email interface module 112. The memory device 1374 and/or the storage device 1358 of the client device 1370 may store instructions which, when executed by the at least one processor 1372, cause the at least one processor 1372 to perform any feature or combination of features described hereinbefore as performed by the email client module 122 and/or by the web browser module in the customer client device 120 used for communicating with the account management module 102.

Although FIG. 8 shows a single e-commerce server 1350 and a single client device 1370, the functionality described hereinbefore as performed by the e-commerce serve 1350 and/or the client device 1370 may be distributed across any number of devices that possesses similar characteristics and/or that include similar components 1352, 1354, 1356, 1358, 1372, 1374, 11375, 1376, 1377 as the e-commerce server 1350 and/or the client device 1370.

While examples are provided above with respect to FIGS. 1-8 which includes the use of email communications, the features described hereinbefore may also be implemented using different types of communications technology. For example, the features described hereinbefore may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

Figure 9:
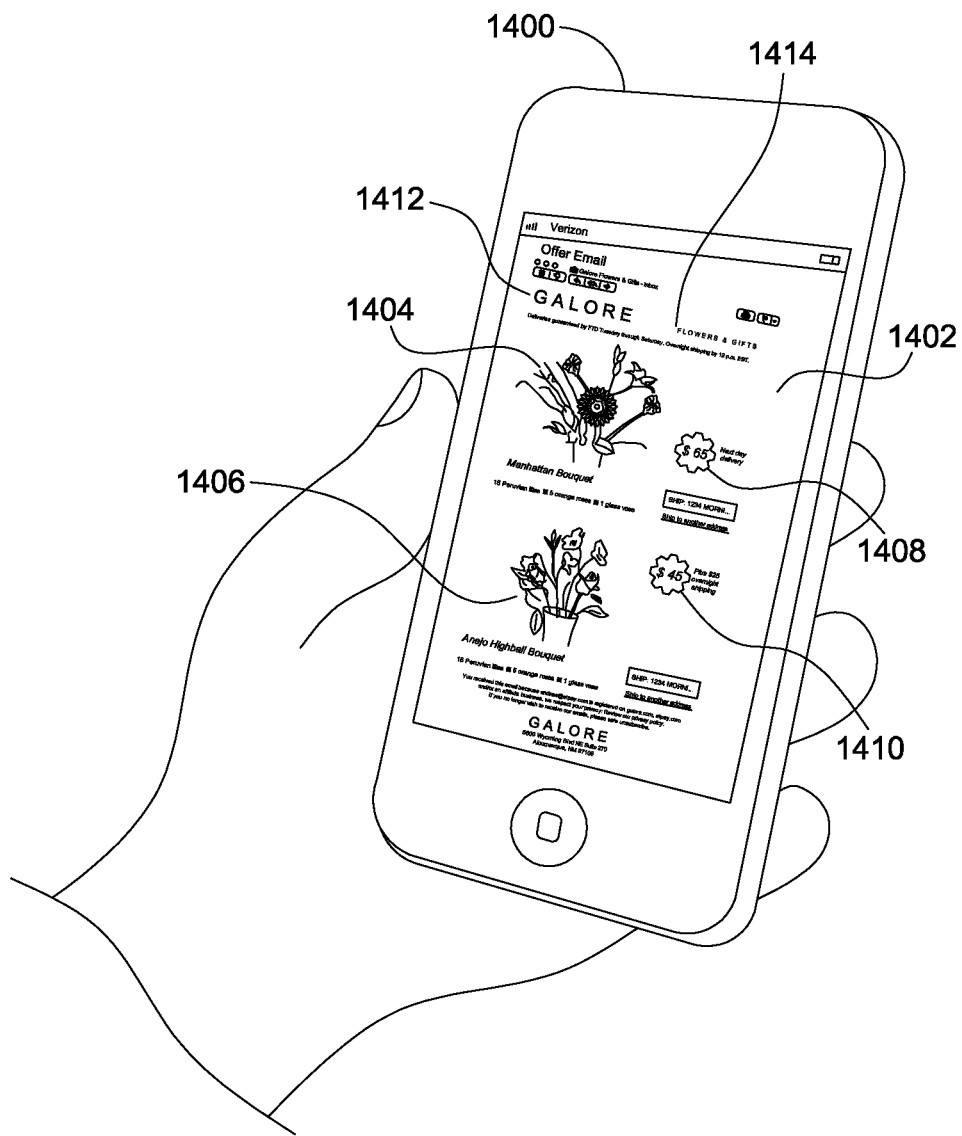
FIG. 9 shows the present invention being implemented in a mobile phone.

Additionally, the invention may be implemented using any type of technology or hardware capable to performing the features described herein. For example, with respect to the receiving and sending of emails by customers, FIG. 9 shows an example of an email message 1402 received by the user of a smart phone 1400. The email message 1402 includes two products 1404 and 1406 wherein the user may simply click on the products 1404 and 1406 using the smart phone 1400 to purchase the item desired by the user. As is shown in FIG. 9, the email message 1402 includes the price of each product 1408, 1410 along with addition related information as described in detail hereinbefore. The email message 1402 also includes the company, which in this case is Galore 1412 and an indication of the types of products, which in this case is Flowers and Gifts 1414, offered for sale in the email message 1402.

Figure 10:
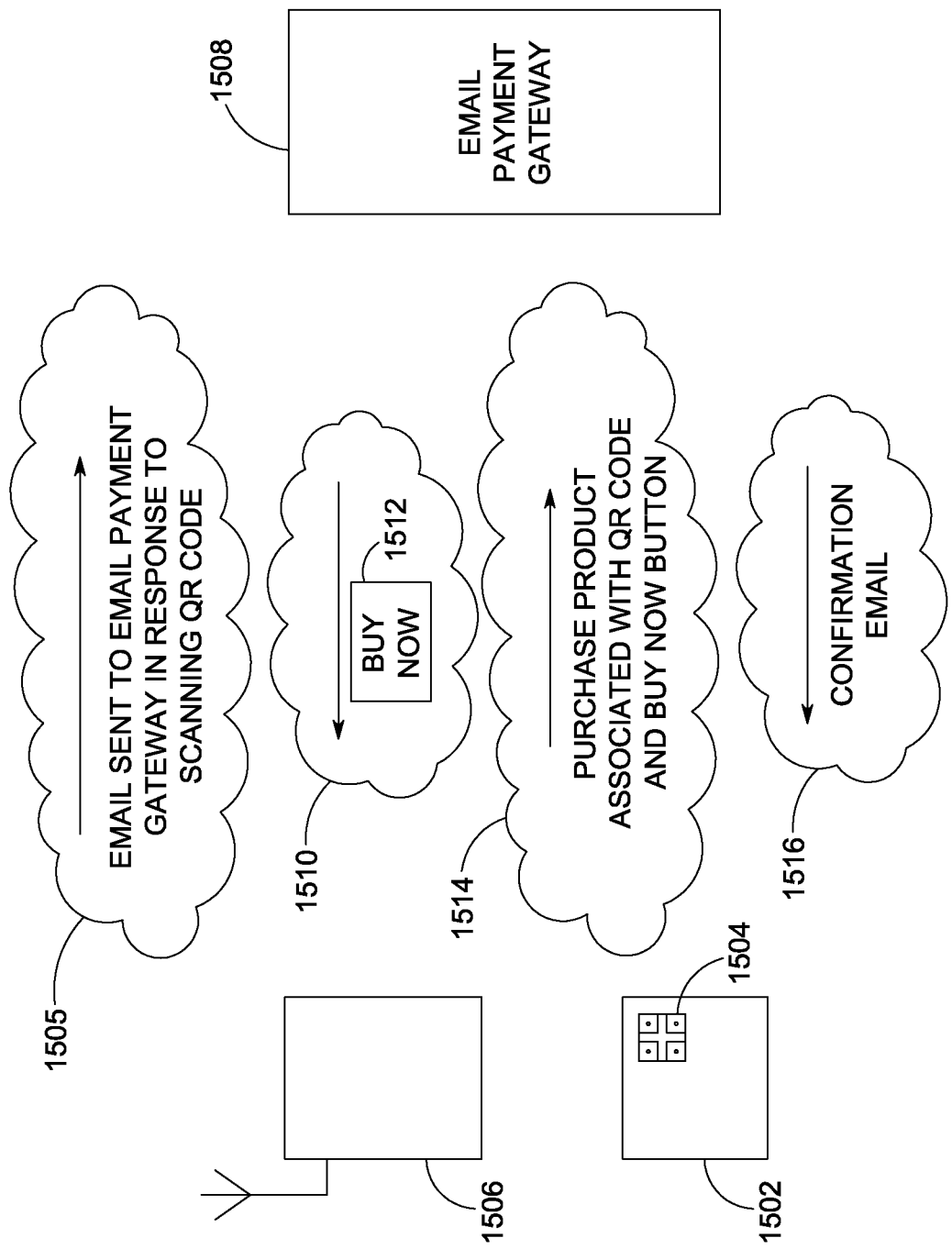
FIG. 10 is a diagram of a system for allowing a user to use quick response (QR) codes to obtain offers on products associated with the QR codes and purchase such products.

Referring now to FIG. 10, in an additional embodiment, the email payment gateway (reference numeral 115 of FIG. 1) may be configured to enable users with smart phones to received @PAY offers using print media quick response (QR) codes. The email payment gateway was described in detail hereinbefore and, for convenience, will simply be shown in FIG. 10 using reference numeral 1508.

By way of example, in this embodiment, a consumer views an advertisement/product 1502 having a QR code 1504 and scans the QR code 1504 using their smart phone 1506. Scanning the QR code 1504 generates an email 1505 (e.g. using the consumer's smart phone email protocol) addressed to the email payment gateway 1508 requesting information on the advertised product(s) associated with the QR code 1504. In this embodiment, the email 1505 may be configured to be automatically sent to the email payment gateway 1508 based on the scanning of the QR code 1504 or the email 1505 may be generated and sent upon the user hitting the send button.

The email payment gateway 1508 receives the email 1505 and responds to the consumer with an email 1510 that includes information on the product(s) in the advertisement (i.e. product(s) associated with the QR code 1504). Included in the email 1510, for each product associated with the QR code 1504, is as button 1512 as described above (e.g. an @PAY "buy now" button). The button 1512 includes a mail-to hyperlink as described above that generates an outgoing email reply 1514 including a request to purchase the advertised product. Upon execution of the mail-to hyperlink, as with email 1505, the reply email 1514 may automatically be sent to the email payment gateway 1508 or the email 1514 may be generated and sent upon the user hitting the send button.

It is noted that email 1510 may be configured to include not only button 1512 (and corresponding executable hyperlink) but may also additional "buy now" buttons for additional products similar to the advertised product that the user may be interested in purchasing instead of and/or in addition to the advertised product.

The email payment gateway 1508 processes the consumer's email address. If the consumer is already in the system as a member, the email payment gateway 1508 processes the order as described above and fulfills the order using the shipping address and payment information using the consumer's (i.e. member) profile. The email payment gateway 1508 generates a confirmation email which is sent to the consumer/member that indicates the order is complete.

If the consumer's email address is not in the email payment gateway 1508 as a member, an email is sent to the consumer (not shown) including a hyperlink to a web-based page that allows the consumer to input shipping and payment information. Once the information is properly input into the email payment gateway 1508 and the payment is processed, the consumer is sent a confirmation email 1516 as hereinbefore described. In this case, the order is complete and the non-member consumer is now listed in the email payment gateway 1508 as a member for future purchases.

Although the messaging between the smart phone 1506 and the email payment gateway 1508 has been described as being conducted by email by way of example, the messaging may comprise a text message, an email message or a multimedia service (MMS) message, a tweet, an instant message, or a Facebook message or post. Additionally, a combination of these messages may be used. For example, the first message 1505 may be a text, and the email payment gateway may respond with an email 1510, or an email and a text. This may be configurable by the user.

As used herein, the term "vendor" broadly refers to and is not limited to a business, for-profit organization, a non-profit organization, any other type of organization, and/or an individual person. One example of a business or for-profit organization is an online retailer. Examples of non-profit organizations include fundraising organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described hereinbefore may be used alone without the other features and elements or in various combinations with or without other features and elements. Sub-elements of the methods and features described hereinbefore may be performed in any arbitrary order (including concurrently), in any combination or sub-combination.

What is claimed is:

1. An email payment gateway that utilizes Simple Mail Transfer Protocol) (SMTP) to improve security of an e-commerce transaction, the email payment gateway comprising:
   a database that stores information including a plurality of Universal Unique Identifiers (UUIDs) and a plurality of email addresses of a plurality of customers;
   a communication interface that is communicatively coupled to a client device of a user; and
   at least one processor communicatively coupled to the database and the communication interface, wherein the at least one processor:
   receives, using the communication interface, a first email from the client device, wherein the first email identifies one or more products associated with a quick response (QR) code that is scanned to generate the first email,
   sends, using the communication interface, a second email to the client device that includes a mailto link, a first UUID that is associated with a particular product, and a second UUID that is associated with the user, wherein the mailto link when activated by the user selects the particular product from the one or more products and generates a third email that is sent to the email payment gateway, receives, using the communication interface, the third email from the client device, wherein the third email includes the first UUID and the second UUID, compares the first UUID and the second UUID received in the third email with the plurality of UUIDs in the database, and on a condition that the first UUID and the second UUID match the plurality of UUIDs in the database:

processes payment and purchase of the particular product.

2. The email payment gateway of claim 1, wherein the particular product is selected from the one or more products by activing one of a plurality of mailto links contained in the first email includes.

3. The email payment gateway of claim 1, wherein the device of the user scans the QR code.

4. The email payment gateway of claim 1, wherein the second email further includes promotional information about the one or more products.

5. The email payment gateway of claim 1, wherein processor further:

compares an email address of a sender of the second email with the plurality of email addresses of the plurality of customers stored in the database, and on a condition that the email address of the sender of the second email is not contained in the database:

sends a registration link to the user, wherein the registration link enables the user perform a registration process that adds the email address to the database.

6. The email payment gateway of claim 5, wherein the registration process is performed using at least one of an email registration form or a website registration form.

7. An email payment gateway that utilizes Simple Mail Transfer Protocol (SMTP) to improve security of an e-commerce transaction, the email payment gateway comprising:

a database that stores information including a plurality of Universal Unique Identifiers (UUID) and a plurality of email addresses of a plurality of customers;

a communication interface that is communicatively coupled to a client device of a user and a vendor system; and at least one processor communicatively coupled to the database and the communication interface, wherein the at least one processor:

generates a quick response (QR) code that is associated with one or more products, wherein the QR code when scanned generates a first email message addressed to the email payment gateway, receives, using the communication interface, the first email from the client device, sends, using the communication interface, a second email to the client device that includes a mailto link, a first UUID that is associated with a particular product, and a second UUID that is associated with the user, wherein the mailto link when activated by the user selects the particular product from the one or more products and generates a third email that is sent to the email payment gateway, receives, using the communication interface, the third email from the client device, wherein the third email includes the first UUID and the second UUID, compares the first UUID and the second UUID received in the third email with the plurality of UUIDs in the database, and on a condition that the first UUID and the second UUID match the plurality of UUIDs:

transmits, using the communication interface, a request to purchase the particular product to the vendor system, wherein the request includes payment information associated with the user.

8. The email payment gateway of claim 7, wherein particular product is selected from the one or more products by activing one of a plurality of mailto links contained in the first email.

9. The email payment gateway of claim 7, wherein the device of the user scans the QR code.

10. The email payment gateway of claim 8, wherein the second email further includes promotional information about the one or more products.

11. The email payment gateway of claim 7, wherein processor further:

compares an email address of a sender of the second email with the plurality of email addresses of the plurality of customers stored in the database, and on a condition that the email address of the sender of the second email is not contained in the database:

sends a registration link to the user, wherein the registration link enables the user perform a registration process that adds the email address to the database.

12. The email payment gateway of claim 11, wherein the registration process is performed using at least one of an email registration form or a website registration form.

13. The email payment gateway of claim 1, wherein the processor further:

generates the QR code that is scanned to generate the first email.

14. A method of improving security of an e-commerce transaction using Simple Mail Transfer Protocol) (SMTP), the method comprising:

receiving, by a processor of an email payment gateway, a first email from a client device, wherein the first email identifies one or more products associated with a quick response (QR) code that is scanned to generate the first email, sending, by the processor of the email payment gateway, a second email to the client device that includes a mailto link, a first UUID that is associated with a particular product, and a second UUID that is associated with a user, wherein the mailto link when activated by the user selects the particular product from the one or more products and generates a third email that is sent to the email payment gateway, receiving, by the processor of the email payment gateway, the third email from the client device, wherein the third email includes the first UUID and the second UUID, comparing, by the processor of the email payment gateway, the first UUID and the second UUID received in the third email with a plurality of UUIDs stored in a database of the email payment gateway, and on a condition that the first UUID and the second UUID match the plurality of UUIDs:

processing, by the processor of the email payment gateway, payment and purchase of the particular product.

15. The method of claim 14, wherein the particular product is selected from the one or more products by activing one of a plurality of mailto links contained in the first email.

16. The method of claim 14, wherein the device of the user scans the QR code.

17. The method of claim 14, further comprising:

comparing, by the processor of the email payment gateway, an email address of a sender of the second email with a plurality of email addresses of a plurality of customers stored in the database, and on a condition that the email address of the sender of the second email is not contained in the database:

sends a registration link to the user, wherein the registration link enables the user perform a registration process that adds the email address to the database.

18. The method of claim 14, further comprising:

generating, by the processor of the email payment gateway, the QR code that is scanned to generate the first email.

19. The email payment gateway of claim 1, wherein on the condition that the first UUID and the second UUID match the plurality of UUIDs in the database, the processor further:

sends, using the communication interface, a fourth email confirming purchase of the particular product to the client device.

20. The method of claim 14, wherein the condition that the first UUID and the second UUID match the plurality of UUIDs in the database, the method further comprises:

sending, by the processor of the email payment gateway, a fourth email confirming purchase of the particular product to the client device.

* * * * *